3,260,716
PROCESS FOR THE PREPARATION OF NEW
5-NITROFURYL COMPOUNDS
Akira Takai, Isamu Saikawa, Toyoo Maeda, Yutaka Kodama, Ikuko Takamichi, Yasumasa Matsubara, and Shiro Hirai, all of Toyama, Japan, assignors to Toyama Kagaku Kogyo Kabushiki Kaisha, Tokyo, Japan
No Drawing. Filed Sept. 6, 1963, Ser. No. 307,006
Claims priority, application Japan, Sept. 11, 1962, 37/38,950; Dec. 4, 1962, 37/53,597
4 Claims. (Cl. 260—240)

This invention relates to new chemical compounds. More particularly, it is concerned with new nitrofuran derivatives having 2-amino-1,3,4-oxadiazole ring represented by the formula

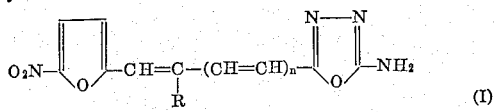

(I)

wherein R is hydrogen, a lower alkyl group, which may be either straight or branched and contains from 1 to 5 carbon atoms such as methyl, ethyl, propyl, isopropyl, n-butyl, isobutyl, n-amyl or isoamyl, an unsubstituted or substituted phenyl group such as phenyl, p-nitrophenyl, p-chlorophenyl or p-methoxyphenyl, and $n$ is an integer 0 or 1.

The 5-nitro-2-furyl compounds having the above-described Formula I are novel compounds unknown in the prior art and possess potent antibacterial activities.

It is an object of the present invention to provide novel 5-nitro-2-furyl compounds having the above-described Formula I useful as antibacterial agents. Another object is the provision of a process for the preparation of said compounds. Other objects will become apparent from the following description.

According to the present invention, the 5-nitro-2-furyl compounds having the above-described Formula I may be prepared by reacting a 5-nitro-2-furyl compound having the formula

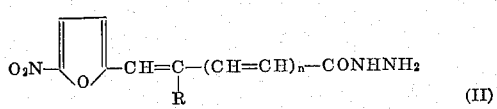

(II)

wherein R and $n$ have the same meanings as set forth above with cyanogen halide wherein the halogen is bromine or chloride in the presence or absence of acid binding agent.

In carrying out the process according to the present invention, the reaction is preferably carried out in water, an inert organic solvent such as alcohols, for example, methanol and ethanol, dioxane, ethylene glycol monomethylether, dimethylformamide, tetrachlorethane, or dichlorethane or an aqueous organic solvent such as aqueous alcohols or aqueous dioxane. The temperature at which the reaction is conducted is suitably reflux temperature, but this may be raised or lowered, if desired. The reaction may be carried out in the presence of acid binding agent such as alkali or alkali-earth metal carbonates or bicarbonates, for example, sodium carbonate, potassium carbonate, calcium carbonate or sodium bicarbonate to give a good yield. The reaction is usually effected by introducing with stirring cyanogen bromide or a solution of cyanogen bromide or cyanogen chloride gas into a suspension of the 5-nitro-2-furyl compound having the Formula II in the solvent cited above at room temperature and then heating the mixture under reflux for 0.5–10 hours.

After completion of the reaction, the reaction product may be isolated from the reaction mixture by one of the conventional methods. For example, cooling of the reaction mixture provides the desired product, which is filtered out, washed and dried. If necessary, the reaction mixture is concentrated to give the desired product.

The starting material in the process of this invention having the above-described Formula II may be obtained by reacting 5-nitro-2-furyl compounds having the Formula III

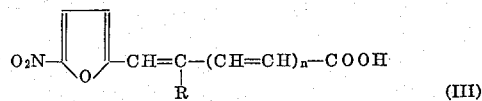

(III)

wherein R and $n$ have the same meanings as set forth above with thionyl chloride or phosphorus pentachloride and then treating the acid chloride thus obtained with hydrazine hydrate in an inert organic solvent.

The following examples are given for the purpose of illustrating the present invention, but are not intended to be limiting on the scope thereof.

*Example 1.—2-amino-5(5-nitrofurylethenyl)-1,3,4-oxadiazole*

(a) To a suspension of 2.0 g. of 5-nitrofurylacroylhydrazide and 0.9 g. of sodium bicarbonate in 50 ml. of water is added dropwise with stirring an aqueous solution of 1.6 g. of cyanogen bromide at 60° C. for 1 hour. The reaction mixture is kept at 60° C. for additional 3 hours, followed by cooling to provide about 1.9 g. of the crude product. Recrystallization of the product from dimethylformamide gives yellow-brown crystals, M.P. 272° C. (dec.), weighing 1.4 g. (64% of the theoretical amount).

(b) To a solution of 2.0 g. of 5-nitrofurylacroylhydrazide in 40 ml. of methanol is added dropwise with stirring a methanolic solution of 1.2 g. of cyanogen bromide, and the mixture is heated under reflux for 1 hour, followed by cooling to provide the crude product which is collected by filtration. On concentration of the mother liquor additional amount of the product is obtained.

The combined product is recrystallized from methanol to give 1.7 g. of yellow-brown crystals melting at 270° C. (75% of the theoretical amount).

Recrystallization from dimethylformamide gives the yellow scale crystals, M.P. 272° C. (dec.).

(c) Through a mixture of 2.0 g. of 5-nitrofurylacroylhydrazide in 20 ml. of ethylene glycol monomethylether is passed with stirring 0.8 g. of cyanogen chloride gas at room temperature. The resulting mixture is heated at 100° C. for 1 hour, followed by cooling to provide yellow scale crystals, M.P. 271° C. (dec.), weighing 1.3 g. (57.5% of the theoretical amount).

*Example 2.—2-amino-5{1-phenyl-2(5-nitrofuryl)ethenyl}-1,3,4-oxadiazole*

To a mixture of 1.5 g. of 2-phenyl-3-(5-nitrofuryl)acroylhydrazide (M.P. 182° C., dec.) in 30 ml. of methanol is added dropwise with stirring a methanolic solution of 1 g. of cyanogen bromide at room temperature. The resulting mixture is heated under reflux for 3 hours and concentrated under reduced pressure to distil off the methanol. The residue is recrystallized from ethyl alcohol to give yellow crystals, M.P. 192° C. (dec.), weighing 1.3 g.

*Example 3.—2-amino-5{1-methyl-2(5-nitrofuryl)ethenyl}-1,3,4-oxadiazole*

To a suspension of 2.8 g. of 2-methyl-3-(5-nitrofuryl)acroylhydrazide in 120 ml. of methanol is added dropwise with stirring 1.7 g. of cyanogen bromide. The mixture is heated under reflux for 2 hours, followed by cooling to provide crystals, which are collected by filtration.

The mother liquor is concentrated and water is added to the concentrate to give additional crystals. The combined product is recrystallized from dimethylformamide.

In this way yellow needles are obtained, M.P. 280° C. (dec.), weighing 1.84 g.

*Example 4.—2-amino-5{1-ethyl-2-(5-nitrofuryl) ethenyl}-1,3,4-oxadiazole*

To a suspension of 10 g. of 2-ethyl-3-(5-nitrofuryl) acroylhydrazide and 4 g. of sodium bicarbonate in 240 ml. of methanol is added dropwise with stirring a methanolic solution of 5.6 g. of cyanogen bromide at room temperature. A deep yellow solution is formed, which soon begins to precipitate orange crystals with splitting out carbon dioxide gas. The mixture is heated under reflux for 2 hours and then concentrated to distil off the methanol. To the residue is added water to give crystals. The product is collected by filtration and recrystallized from dimethylformamide to give orange scale crystals melting at 232–233° C. (dec.), weighing 6.7 g. (62% of the theoretical amount).

*Example 5.—2-amino-5(5-nitrofurylbutadienyl)- 1,3,4-oxadiazole*

To a suspension of 0.7 g. of 5-(5-nitrofuryl)-2,4-pentadienoylhydrazide (M.P. 159° C., dec.) in 70 ml. of methanol is added dropwise with stirring 0.5 g. of cyanogen bromide and the mixture is heated under reflux for 2 hours. A small amount of precipitates is filtered and the mother liquor is concentrated under reduced pressure. To the residue is added water to give yellow crystals, which are collected by filtration and recrystallized from aqueous methanol.

In this way crystals are obtained, M.P. 134° C. (dec.) weighing 0.43 g.

*Example 6.—2-amino-5{3-methyl-4(5-nitrofuryl) butadienyl}-1,3,4-oxadiazole*

(a) To a suspension of 0.5 g. of 4-methyl-5-(5-nitrofuryl)-2,4-pentadienoylhydrazide (M.P. 178–182° C.) and 0.2 g. of sodium bicarbonate in 20 ml. of water is added dropwise with stirring a solution of 0.32 g. of cyanogen bromide in 1.6 ml. of methanol. The mixture is warmed at 58–60° C. for 5 hours, during which time its brown colour is intensified without giving a solution. The reaction mixture is cooled, and the precipitated product is collected by filtration and washed with ethanol. In this way there are obtained crude dark brown crystals melting at 250–254° C. (dec.). Recrystallation of the crystals from dimethylforamide gives yellow crystals, M.P. 268° C. (dec.) weighing 0.47 g. (85% of the theoretical amount).

(b) Into a suspension of 0.5 g. of 4-methyl-5-(5-nitrofuryl)-2,4-pentanoylhydrazide and 0.2 g. of sodium bicarbonate in 20 ml. of methanol is introduced with stirring 0.12 g. of cyanogen chloride gas. The mixture is heated under reflux for 4.5 hours, during which time its brown colour is intensified without giving a solution. While hot, the product is collected by filtration to give dark brown-yellow crystals, M.P. 250–260° C. (dec.), weighing 3.9 g. (74% of the theoretical amount).

Recrystallation of the crystals from dimethylformamide gives yellow crystals melting at 268° C. (dec.).

*Example 7.—2-amino-5{3-ethyl-4(5-nitrofuryl) butadienyl}-1,3,4-oxadiazole*

To a suspension of 0.5 g. of 4-ethyl-5-(5-nitrofuryl)-2,4-pentadienoylhydrazide (M.P. 152–154° C.) and 0.2 g. of sodium bicarbonate in 20 ml. of methanol is added dropwise with stirring a solution of 0.32 g. of cyanogen bromide in 1.6 ml. of methanol. The mixture is heated under reflux for 4.5 hours and the precipitates are filtered off while hot. The mother liquor is concentrated and water is added to the dark brown concentrate to give yellow crystals, M.P. 193–195° C. (dec.), weighing 0.37 g. (68% of the theoretical amount).

Recrystallation from 50% aqueous dimethylformamide gives yellow scale crystals melting at 215–218° C. (dec.).

We claim:
1. A compound having the formula

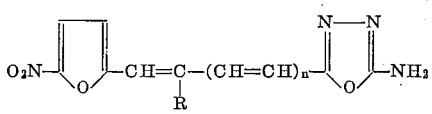

wherein R is hydrogen, a lower alkyl group, which may be either straight or branched and contains from 1 to 5 carbon atoms, or phenyl and n is an integer 0 or 1.

2. 2-amino-5(5-nitrofurylethenyl)-1,3,4-oxadiazole.
3. 2-amino-5(5-nitrofurylbutadienyl)-1,3,4-oxadiazole.
4. 2 - amino-5{1-methyl-2(5-nitrofuryl)ethenyl}-1,3,4-oxadiazole.

References Cited by the Examiner

UNITED STATES PATENTS

| | | | |
|---|---|---|---|
| 2,883,391 | 4/1959 | Swain | 260—307 |
| 3,146,232 | 8/1964 | Saikachi et al. | 260—240 |

OTHER REFERENCES

Saikawa, Yakugaku Zasshi, vol. 84, pages 212 to 219 (March 1964).

WALTER A. MODANCE, *Primary Examiner.*

JOHN D. RANDOLPH, *Examiner.*